May 17, 1960 C. W. ELLIS III 2,936,836

MECHANISM FOR INDICATING AND CORRECTING LIFT DIFFERENCES IN HELICOPTER ROTORS

Filed June 1, 1956 4 Sheets-Sheet 1

INVENTOR.
CHARLES W. ELLIS III
BY Teller & McCormick
ATTORNEYS

May 17, 1960 C. W. ELLIS III 2,936,836

MECHANISM FOR INDICATING AND CORRECTING LIFT DIFFERENCES IN HELICOPTER ROTORS

Filed June 1, 1956 4 Sheets-Sheet 2

INVENTOR.
CHARLES W. ELLIS III
BY Teller & McCormick
ATTORNEYS

May 17, 1960 C. W. ELLIS III 2,936,836

MECHANISM FOR INDICATING AND CORRECTING LIFT DIFFERENCES IN HELICOPTER ROTORS

Filed June 1, 1956 4 Sheets-Sheet 3

INVENTOR.
CHARLES W. ELLIS III
BY Teller & McCormick
ATTORNEYS

INVENTOR.
CHARLES W. ELLIS III
BY Teller & McCormick
ATTORNEYS

United States Patent Office 2,936,836

Patented May 17, 1960

2,936,836

MECHANISM FOR INDICATING AND CORRECTING LIFT DIFFERENCES IN HELICOPTER ROTORS

Charles W. Ellis III, Windsor Locks, Conn., assignor to The Kaman Aircraft Corporation, Bloomfield, Conn., a corporation of Connecticut Application June 1, 1956, Serial No. 588,722

34 Claims. (Cl. 170—160.13)

Desirably each blade of a multi-bladed helicopter rotor is exactly like each other blade, and when this is so each blade during each rotor rotation has exactly the same action as each other blade, both as to forces encountered and applied and as to path of movement. However, the blades may unavoidably have minor physical differences in shape or in material or in mounting, and when there are such physical differences the blades may have differences in action or function. The rotor may have an unbalance usually resulting directly or indirectly from a difference in lift between one blade and another and the unbalance gives rise to an undesirable vibration. The unbalance or lift difference ordinarily results in differences in the paths of movement of the blade tips. A common procedure for at least approximately correcting unbalance or lift difference has been to merely make whatever blade adjustments were necessary to bring about uniform paths of blade tip movement, this ordinarily being referred to as "blade tracking."

The Emmerson and Polleys application Serial No. 539,718 for Blade Tracking Mechanism for a Helicopter, filed October 11, 1955, discloses a manually controlled mechanism operable during flight for adjusting the lift of one blade called a "slave" blade relatively to another blade called a "master" blade to correct unbalance or a lift difference and ordinarily to produce "tracking." The invention disclosed in the last said application is particularly adapted for use with a helicopter of the type disclosed in the Kaman and Stevens Patent No. 2,695,674 for Control System for Multiple Rotor Helicopter, dated November 30, 1954, but said invention is not necessarily so limited. Said application Serial No. 539,718 and said Patent No. 2,695,674 are incorporated herein by reference.

The use of the mechanism set forth in said Emmerson and Polleys application was entirely subject to the judgment of the pilot and he had no means for specifically indicating the existence of lift difference or for indicating the location or direction thereof. It was necessary for the pilot to sense the vibrations or to visually observe the out-of-track relationship of the blades, or try one adjustment or another until lift equalization was attained.

One general object of the present invention is to provide means for definitely indicating the location and direction of any rotor unbalance, that is, of any difference in lift between the slave blade or blades and the master blade. The indicating means may include an indicator observable by the pilot to enable him to then make the necessary blade adjustment for correcting the unbalance or lift difference or the indicating means may include a switch and a servo-motor controlled thereby for automatically making said necessary blade adjustment.

Another general object of the invention is to provide a means for indicating unbalance or lift difference as above stated which is dependent upon the relative movement of the slave blade out of its normal relationship with the master blade or with other parts, this relative movement being the result of the lift difference.

Other and more specific objects of the invention are to provide various electrical and mechanical features which serve or cooperate for the attainment of the said general objects.

The drawings show in detail several embodiments of the invention, but it will be understood that various changes may be made from the constructions shown and that the drawings are not to be construed as defining or limiting the scope of the invention, the claims forming a part of this specification being relied upon for that purpose.

*The helicopter as shown in Figs. 1 to 4*

Figures 1, 2, 3:
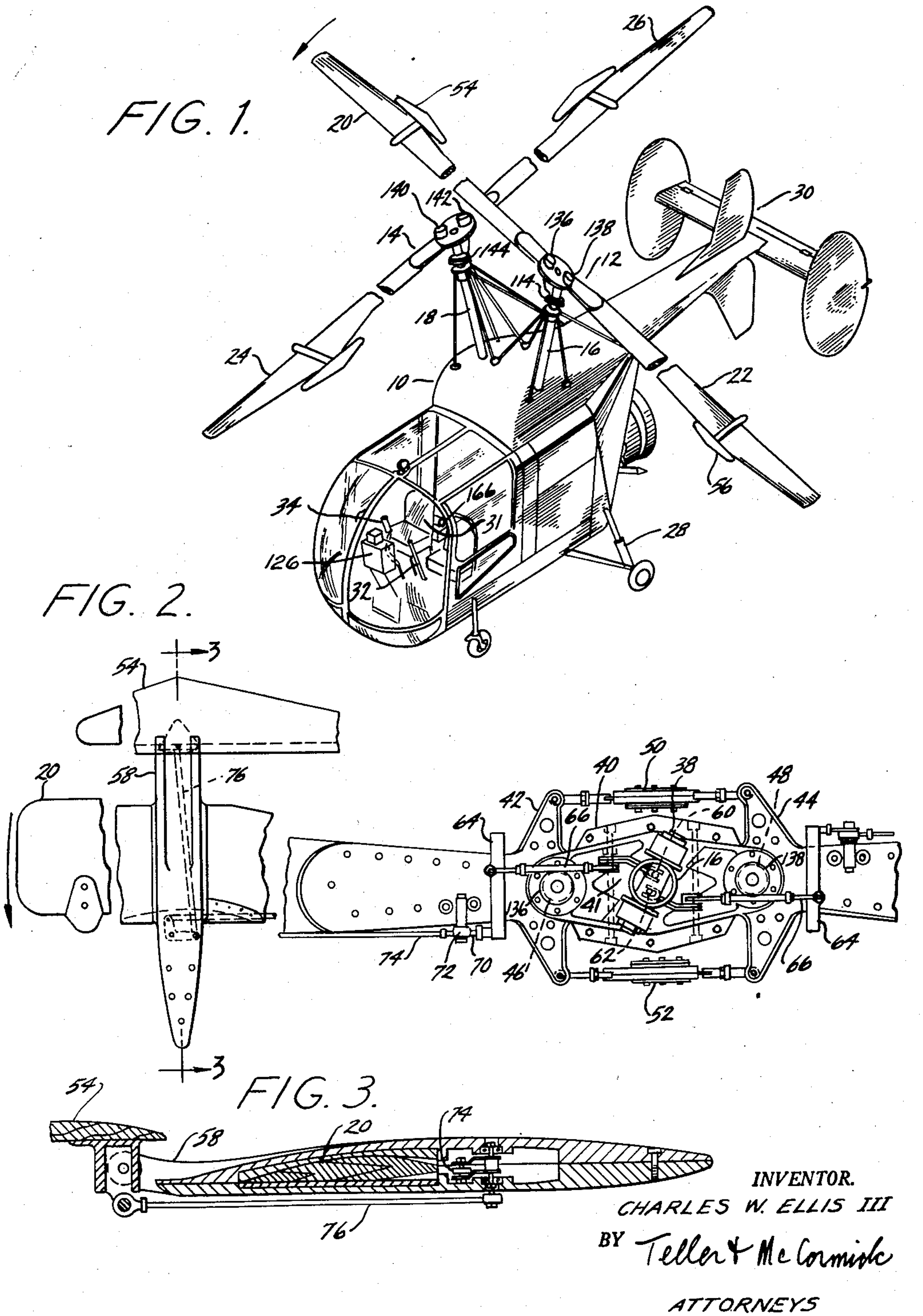
Fig. 1 is a partly schematic perspective view of a helicopter having two rotors and adapted for the incorporation of the present invention therein, this view showing schematically the location of certain electrical parts or devices constituting parts of the mechanism for indicating and correcting lift differences.
Fig. 2 is an enlarged plan view of a portion of one of the rotors shown in Fig. 1.
Fig. 3 is a transverse sectional view taken along the line 3—3 of Fig. 2.
Figures 4, 5, 6, 7:
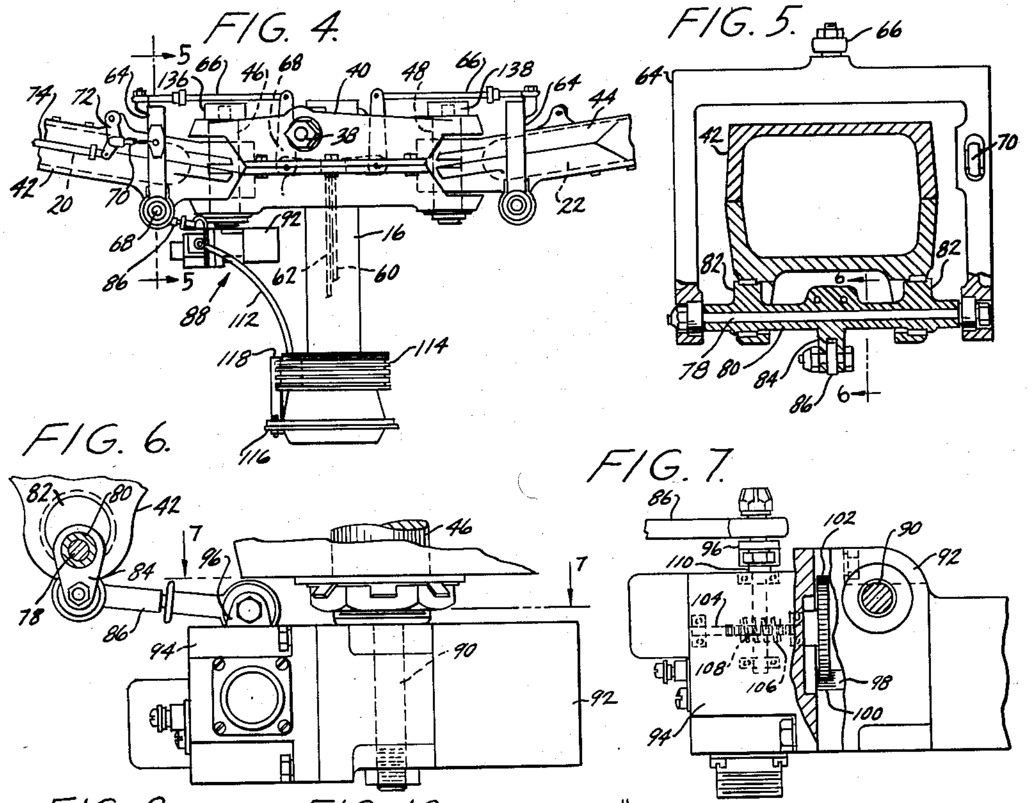
Fig. 4 is a fragmentary side view of the rotor shown in Fig. 2 with certain parts omitted, this view including certain parts of the lift adjusting mechanism.
Fig. 5 is an enlarged vertical sectional view taken along the line 5—5 of Fig. 4.
Fig. 6 is an enlarged fragmentary combined side and sectional view of a portion of the lift equalizing mechanism as shown in Fig. 4, the left sectional portion of this view being taken along the line 6—6 of Fig. 5.
Fig. 7 is a combined plan and horizontal sectional view taken along the line 7—7 of Fig. 6.

The invention as to certain aspects thereof is of general applicability, but as to other aspects it is particularly adapted for a helicopter having rotors of the type disclosed in said Patent No. 2,695,674. Fig. 1 is a partly schematic view showing such a helicopter, said view being taken from the left of the helicopter and toward the rear. Figs. 2, 3 and 4 show in greater detail one of the rotors of said helicopter. Reference is made to said patent for a more complete disclosure of any details not herein fully disclosed.

The helicopter, as shown, comprises a fuselage 10 and two rotors 12 and 14 which are connected with supporting and driving shafts 16 and 18, said shafts being adapted to be driven by a motor not shown. Said shafts extend upwardly from said fuselage 10 and as shown they are spaced apart transversely and they diverge upwardly. The said shafts are interconnected for rotation in unison and in opposite directions, the rotors being so connected with the shafts that their blades 20, 22 and 24, 26 are in intermeshing relationship. Although the shafts 16 and 18 diverge and are not exactly vertical, said shafts and their axes of rotation will, for convenience, be sometimes referred to as being substantially vertical.

The helicopter as shown includes a landing gear 28, an empennage 30, a pilot seat or position 31 in the fuselage, control sticks 32 and 34 operable by a pilot in said pilot position, and various other parts, some of which are or may be conventional and others of which are disclosed in said patent. These various parts need not be described in detail.

Figures 11, 12, 13:
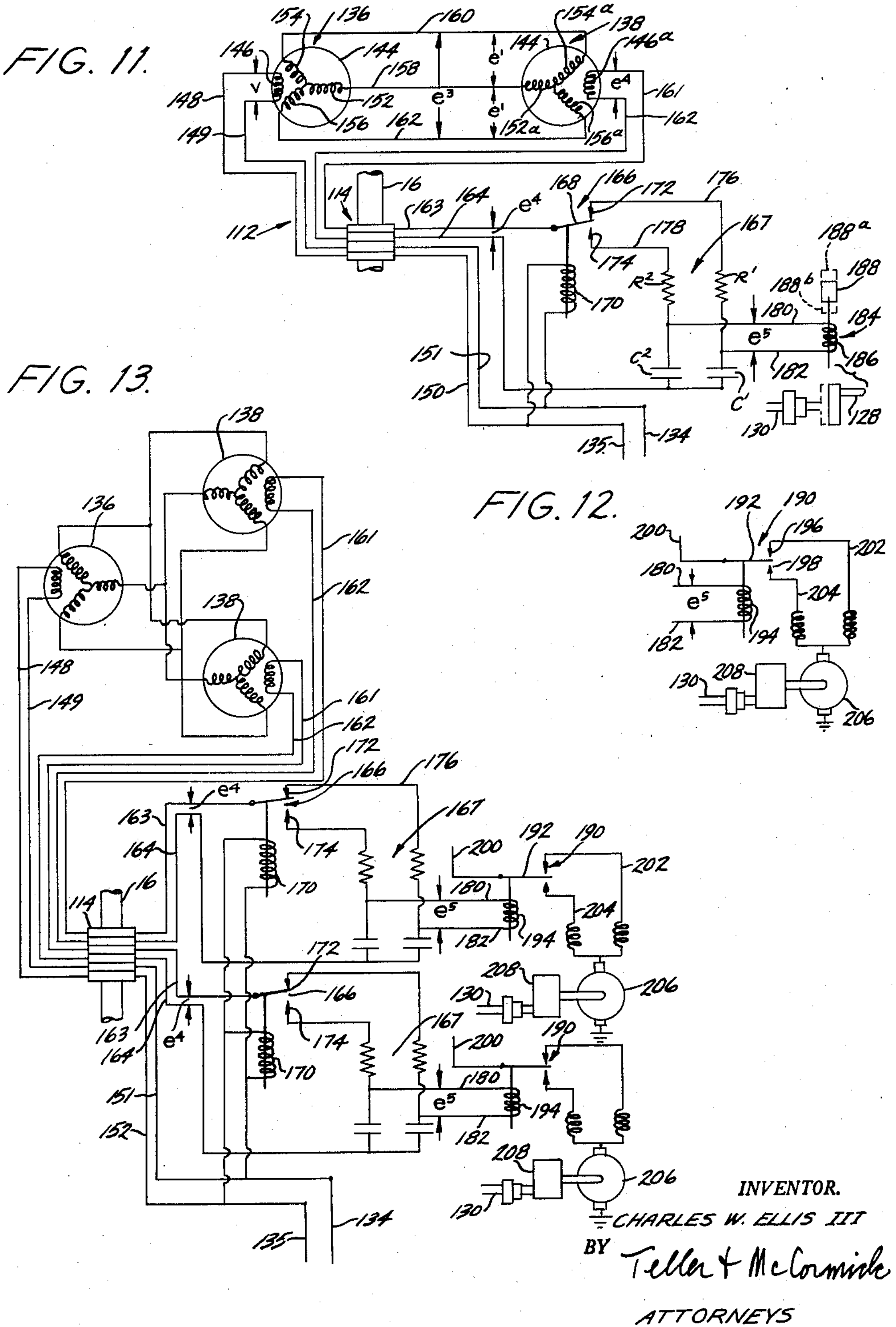
Fig. 11 is a diagram of electrical and mechanical connections for a means for automatically indicating lift differences.
Fig. 12 is a fragmentary diagram similar to a portion of Fig. 11 and showing electrical and mechanical connections for a means for automatically correcting lift differences, some of these connections being alternative to those shown in Fig. 11.
Fig. 13 is a diagram similar to Fig. 12 but showing the electrical and mechanical connections for a three-bladed rotor.
Figures 14, 15:
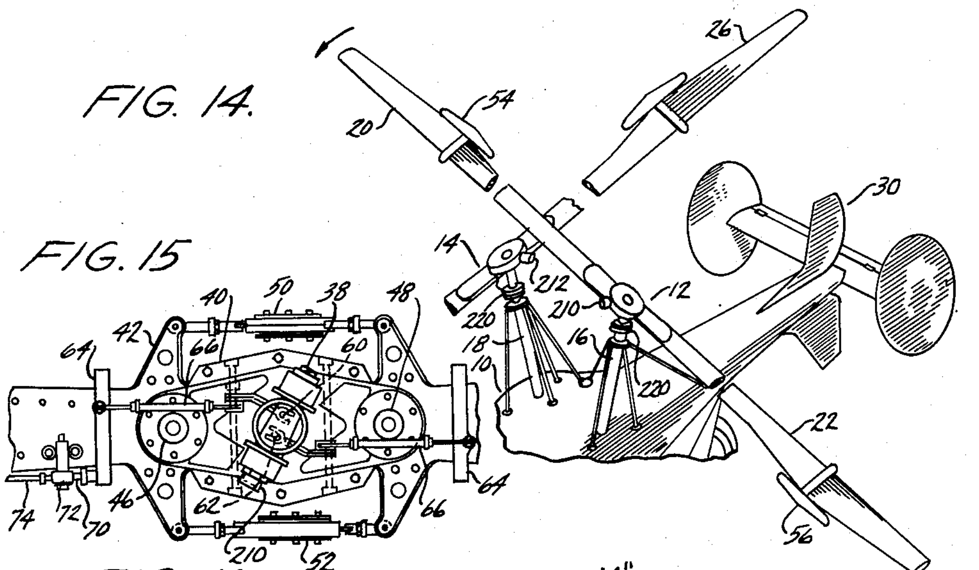
Fig. 14 is a fragmentary perspective view similar to the upper portion of Fig. 1, this view showing schematically the location of certain electrical parts or devices constituting parts of an alternative mechanism for indicating and correcting lift differences.
Fig. 15 is an enlarged plan view similar to a portion of Fig. 2, but showing one of the electrical devices of the alternative mechanism partly shown in Fig. 14.

In order that the manner of operation of the hereinafter described lift equalizing or adjusting mechanism may be fully understood, one rotor and the pitch changing mechanism therefor, and more particularly for one blade thereof, will be fully described. A two-bladed rotor is shown and described, but the invention as to some of its aspects is not so limited. For a three-bladed rotor, the details of blade mounting and connection may be as shown in Figs. 12 to 14 of said application Serial No. 539,718.

Extending through apertures in the upper part of the shaft 16 is a pivot or teetering pin 38 which is shown in Figs. 2 and 4 and serves to pivotally connect a hub member 40 with the shaft, said hub member having a large central aperture 41 through which the upper end of the shaft extends. The pin 38 is perpendicular to the axis of the shaft and said pin is preferably held in fixed relationship to the shaft, the hub member 40 being movable relatively to the pin. The teetering pin 38 is so located with respect to the hub member that the axis of pivotal movement of said hub member is at an acute angle, preferably about 60°, with respect to the longitudinal axes of the blades 20 and 22. The said angle is such that each end of the pivot pin 38 is at the leading side of the longitudinal axis of the corresponding blade.

Two blade supports 42 and 44 are provided at the ends of the hub member 40, these blade supports being connected with the hub member by means of vertical lead-lag hinge pins 46 and 48 for pivotal movement about lag axes parallel to the shaft axis. Said hinge pins are fixed to the respective blade supports and they are movable relatively to the hub member. The inner end or root portions of the blades 20 and 22 are connected with the respective blade supports. Shoulders on the hub member 40 limit relative pivotal movement of the blade supports and the blades in either direction with respect to the hub member. In order to control the movements of the two blade supports and of their corresponding blades about the axes at 46 and 48, said blade supports are interconnected by link means 50 and 52. As hereinafter more fully explained, the two blade supports with their blades do not move in exact unison about said axes, and in order to permit differential movements each of the said link means is variable in length and includes a damper. As shown, the dampers in the said link means act frictionally, but hydraulic dampers may be substituted if desired. The said link means 50 and 52 with the dampers therein resist any pivotal or oscillatory movement of one blade support with its blade about the corresponding lead-lag axis independently of the other blade, but the said means nevertheless permit such independent pivotal or oscillatory movements to limited extents. For more clearly showing other parts, the link 52 is omitted from Fig. 4.

As has been described, the hub and two blades are pivotally movable in unison about the substantially horizontal teetering axis of the pin 38 and the blades are also pivotally movable about the substantially vertical lead-lag axes at 46 and 48. In addition, the blades are adjustable about substantially radial axes extending longitudinally of the blades for the purpose of changes of pitch. Preferably the outer end portions of the blades respectively carry auxiliary aerofoil flaps 54 and 56 which are angularly movable relatively to the blades about axes substantially parallel with said longitudinal axes of the blades. Each flap 54 or 56 may be adjusted angularly about the corresponding said longitudinal axis by relatively movable flap moving connections extending from the flaps to the fuselage. When the blades 20 and 22 are rotating, the flaps 54 and 56 serve by reason of aerodynamic forces acting thereon to adjust the corresponding blades and to thus change the effective pitches of the blades. The extent of the changes in the effective pitches of the blades is dependent upon the angular positions of the flaps as determined by their before-mentioned flap moving connections.

The blades 20 and 22 are shown as being rigidly held at their inner ends or root portions so as to prevent any relative rotative movement of said root portions about axes extending longitudinally of the blades. Each blade is initially positioned as shown in Figs. 2 and 3, but said blade is capable of substantial twisting about its longitudinal main axis and with respect to its nonrotatable root portion so that its effective pitch is changed as the result of the twisting. The blade has torsional resiliency which tends to restore it to its initial normal position and shape after twisting. The before-described flaps 54 and 56 serve aerodynamically to twist the blades and to thus change the pitches thereof.

A bracket 58 is provided for pivotally connecting each flap such as 54 with the corresponding blade 20. The mounting means and the flap moving connections for one flap, that is, the flap 54, are shown in detail in Figs. 2, 3 and 4. The flap moving connections are described in detail in said Emmerson and Polleys application and a very brief description will be sufficient for this present application.

The aforesaid flap moving connections include a link or rod 60 which is located within the hollow shaft 16 and is movable vertically. A similar rod 62 is provided for the flap 56 on the blade 22. The connections between the rods 60 and 62 and the corresponding flaps are similar and when each rod is moved upwardly, the corresponding flap is moved upwardly or counterclockwise, as viewed in Fig. 3, to increase the negative flap pitch and to thus increase the positive pitch of the blade and the upward flexing thereof. When the rods 60 and 62 are moved downwardly, the described movements are reversed and the flaps 54 and 56 are moved downwardly or counterclockwise to decrease the negative flap pitch and to thus decrease the positive pitch of the blade and the upward flexing thereof. Said connection with each flap includes a lever 64 actuated by a link 66, said lever having an inverted U-shaped as shown in Fig. 5 and being pivotally connected to the blade support 42 for movement about a horizontal pivotal axis 68 extending transversely of the blade. Said connection also includes a link 70, and a lever 72 and a push-pull link or rod 74 which extends longitudinally of the blade along the leading edge thereof. Said connection further includes a link 76 extending to the flap.

The rods 60 and 62 for the flaps 54 and 56 on the two blades of the rotor are connected with suitable means in the fuselage for moving them vertically to change the blade pitches in the manner described. By means of said rods the blade pitches may be changed collectively or cyclically, all as fully explained in said Patent No. 2,695,674. The two rods are moved upwardly or downwardly in unison and to uniform extents for collective changes in pitch and they are moved upwardly or downwardly separately and to uniform extents for cyclic changes in pitch.

*Lift adjusting mechanism*

For effecting lift equalization or adjustment any one of the blades of the rotor is arbitrarily chosen as the master blade, and the other or slave blades are adjusted with reference to the master blade so that the lifts of all blades will be substantially equal. For a two-bladed rotor it is only necessary to adjust one slave blade. Usually, but not necessarily, uniformity of lift is attained when the master and slave blades are so adjusted that they "track" at their tips, that is, when the tips of the blades move in the same path. It is recognized that the lift of each blade of a rotor varies substantially during each rotation in accordance with a complex pattern with the result that the tip of the blade does not move in a simple circular path in one plane, but on the contrary moves in a complex path. The complexity of the pattern of the lift and of the path of movement of the blade tips is determined by various factors, such as the alternating forward and rearward movement of each blade during each rotation, centrifugal forces acting on the blades, the tilting or teetering of the rotor and about the axis 38 during each rotation, and the cyclical changing of the blade pitches. However, notwithstanding said complexity, the pattern of lift of each blade should always be the same as the pattern for each other blade and with uniformity of the lift patterns the tips of the blades ordinarily move in the same paths.

When the invention is embodied in a helicopter of the type shown in said Patent 2,695,674, the mechanism for changing or adjusting the lift of the slave blade relatively to that of the matser blade may advantageously be similar to that disclosed in the Emmerson and Polleys application Serial No. 539,718 filed October 11, 1955. This last said mechanism is shown in Figs. 4, 5, 6 and 7, and it will be now described. Reference is made to said application for any details not herein fully disclosed. When the rotor has more than two blades, the last said mechanism is duplicated for each slave blade.

As illustrated, the blade 22 is the chosen master blade and the blade 20 is the slave blade which must be adjusted so as to compensate for any variation in the lift thereof from that of said master blade. The slave blade 20 is adjusted relatively upwardly or downwardly as required, by adjusting the flap 54 on said blade without any corresponding adjustment of the flap 56 on the blade 22. If the blade 20 is too low, the flap 54 thereon is separately moved clockwise so as to separately increase the pitch of said blade and thus increase the upward flexing thereof. If the blade 20 is too high, the flap 54 thereon is separately moved counterclockwise so as to separately decreased the pitch of said blade and thus decrease the upward flexing thereof.

The separate movement of the flap 54 on the blade 20 is effected by relatively adjusting a portion of the flap moving connection, without impairing the effectiveness of said connection for normally moving the flap. Preferably and as shown, the required adjustment is made by moving a pivot pin 78 which provides the pivotal axis 68 for the lever 64. As best shown in Figs. 5 and 6, the pin 78 is supported by a sleeve 80 which is carried by the corresponding blade support 42. The pin projects beyond the ends of the sleeve and the legs of the U-shaped lever 64 are mounted on the ends of the pin. The sleeve

80 has integral eccentrics 82, 82 which fit bearing apertures in the blade support 42. The sleeve 80 also has an integral arm 84 which extends downwardly and is connected with a link 86. By means of the link 86 the sleeve 80 can be turned and by reason of its eccentric mounting it serves to bodily move the pivot pin 78 and the pivotal axis 68 toward the right or toward the left as viewed in Figs. 4 and 6. When the pin 78 is moved toward the right, the rod 74 is moved toward the right and the negative pitch of the flap 54 is decreased and the upward flexing of the blade 20 is decreased. When the pin 78 is moved toward the left, the rod 74 is moved toward the left and the negative pitch of the flap 54 is increased and the upward flexing of the blade 20 is increased. It will be obvious that the described movement of the pin 78 does not in any way affect the normal control of the flap and of the blade pitch by the described linkage.

For moving the link 86 and for thus effecting lift adjustment as explained, there is provided a mechanism, which is indicated generally by 88 in Fig. 4, but omitted from Fig. 1. This mechanism is carried by and rotatable with the rotor and is adapted to be operated or controlled by means to be hereinafter described. As to details, said mechanism 88 can be widely varied, but one mechanism having certain advantageous features is shown in Figs. 4, 6 and 7, reference being made to said application Serial No. 539,718 for a more complete disclosure.

The mechanism 88 is movable with the blade 20 about the axis of the corresponding lead-lag hinge pin 46. Preferably and as shown, said mechanism 88 is carried directly by said lead-lag hinge pin by means of a vertical pin 90 which is in effect an extension of said lead-lag hing pin. The mechanism 88 is shown as comprising a rotary electrical actuator unit 92, a gearing unit 94, and a pivoted arm 96 carried by the unit 94 and connected with thel ink 86. The two units 92 and 94 are rigidly connected with each other. Inasmuch as the mechanism is mounted eccentrically of the axis of rotor rotation, a suitable counterweight, not shown, may be provided.

The actuator unit 92 comprises a rotor 98 which includes a longitudinal shaft, only said shaft being shown in the drawings. Said shaft of the rotor has a pinion 100 at its outer end, as shown in Fig. 7. The pinion 100 meshes with a gear 102 on a longitudinal shaft 104 mounted in the gearing unit and extending into the actuator unit. The shaft 104 carries a worm 106 which meshes with a worm wheel 108 on a transverse shaft 110. The shaft 110 projects at the rear as viewed in Fig. 7, and said arm 96 is secured to the projecting end of said shaft.

Current for operating the rotary actuator unit 92 and for other purposes is supplied to the rotor through wires in a cable 112 which wires are connected respectively with selected rotary slip rings in a group 114 of such rings on the rotor shaft 16. A nonrotary structure 116 is provided adjacent said shaft and brushes 118 on said structure engage and provide electrical connection with said slip rings.

*Control means for lift adjusting mechanism*

Figures 8, 9, 10:
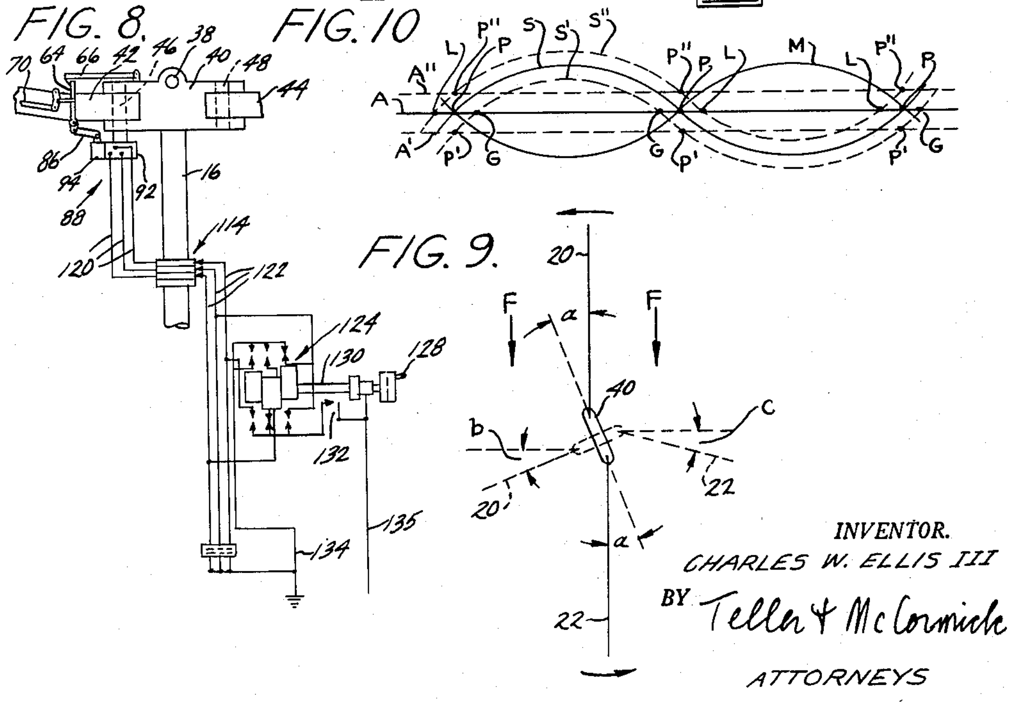
Fig. 8 is a diagram of electrical and mechanical connections for the blade adjusting mechanism.
Fig. 9 is a schematic view illustrating the relative oscillatory movements of the blades of one rotor.
Fig. 10 is a chart further illustrating the relative oscillatory movements of the blades of one rotor and also showing the variations in a corresponding electrical value.

The rotor 98 of the actuator unit 92 has a shiftable or rotatable field, and as shown in Fig. 8 this field is controlled by the current in three conductors 120 which revolve with the hub and are included in the cable 112, the wires serving to rotate the field of the actuator and to cause the rotor thereof to correspondingly rotate. The movable conductors 120 are connected through the slip rings and the brushes with nonrotary conductors 122. The conductors 122 are connected with means on the fuselage 10, such as a step switch 124 for supplying current to the actuator in such a manner as to rotate the field thereof. The step switch and immediately associated parts may be enclosed or partly enclosed in a box 126 located within convenient reach of the pilot as shown in Fig. 1. The step switch 124 is shown in Fig. 8 as including a rotatable element and as being of a known type. In accordance with recognized practice the construction and connections of the switch 124 and of the actuator are such that the current transmitted to the actuator through the described conductors serves to turn the rotor 98 of the actuator unit 92 in unison with the turning of the rotatable element of the switch 124. An example of a motor and a step switch similar to those herein disclosed is found in Patent No. 2,327,341 dated August 24, 1943.

The step switch 124 is shown in Fig. 8 as being manually operable by a rotatable crank or handle 128 on a shaft 130. The switch 124 is connectible by a normally open switch 132 with main leads 134 and 135 connected with a source of low voltage direct current. When manually controlled lift adjustment is to be effected, the pilot moves the handle 128 longitudinally of the shaft to close the switch 132 and thus connect the switch 124 in the circuit. Then the pilot turns the handle 128 in one direction or the other and the step switch 124 causes the rotor 98 of the actuator to turn at the same speed as the handle.

The handle 128 and the parts operated thereby including the switch 124 constitute control means for the lift adjustment mechanism 88, said control means being carried by the fuselage 10 independently of the rotor 12. The conductors 122 and the slip rings 114 and the conductors 120 included in the cable 112 constitute means operatively connecting said control means on the fuselage with the said lift adjustment mechanism 88 on the rotor for enabling said control means to control the operation of said lift adjustment mechanism during rotation of said rotor.

When the helicopter has two rotors such as 12 and 14, it is necessary to provide two lift adjusting means, one for each rotor. The parts and connections shown in Fig. 8 may be regarded as being for the rotor 12. Duplicate parts and connections are provided for the rotor 14.

The helicopter and the lift adjusting mechanisms and control means for such mechanisms as thus far described are essentially the same as set forth in said Emmerson and Polleys application Serial No. 539,718. The present invention is not necessarily so limited, but said helicopter and said adjusting mechanism and said control means are fully disclosed for the reason that they are adequately adapted for cooperation with other features to which the invention more specifically relates.

*Means for detecting and indicating unbalance resulting from lift differences—Figs. 9 to 11*

The present invention relates particularly to automatically acting means for detecting and indicating any unbalance or lack of lift uniformity between the master blade and each slave blade of each rotor. A mechanism embodying the invention includes a means automatically responsive to the difference between the lift of said slave blade and that of said master blade and said mechanism also includes a means located on the fuselage and connected with and controlled by said lift difference responsive means and serving to indicate any difference in blade lift and to also indicate the direction of such difference so that said difference may be corrected by lift adjustment of said slave blade in the proper direction. The present invention also relates particularly to mechanism whereby an indicating means, such as last above outlined, acts automatically to effect the required correcting adjustment without any intervention on the part of the pilot.

The unbalance or lift difference that requires correction ordinarily results in the relative movement of at least one blade out of a normal relationship with the shaft or with another blade. In the herein disclosed embodiments of the invention, a means is provided which makes use of the said relative movement, ordinarily pivotal, for indicating the unbalance or lift difference and the direction thereof. Preferably the last said means also serves for automatically causing the adjusting mechanism to correct said unbalance or lift difference.

In its broader aspects, the invention herein disclosed is not limited to the utilization of any particular relative movement of a blade out of its normal position or relationship, but as shown in Figs. 1, 2, 4 and 8 to 13, such relative movement of a blade about its lead-lag hinge axis is so utilized. This embodiment of the invention will be next described.

When the air loads on the individual blades of a rotor are not equalized, each blade will absorb unequal amounts of rotor shaft torque. This difference in torque absorption results in different average lag angles of the blades with respect to the hub. The inequality of average lag angles results in a steady rotating unbalance force being applied to the helicopter, through the lead-lag hinge pins. Therefore, a measurement and comparison of average lag angles gives an indication of the balance or unbalance of the rotor blades.

Consideration of the relative magnitudes of steady rotating unbalance forces due to lag angle differences and to thrust inclinations due to difference cone angle settings shows that the lag angle differences are very much more important in producing out-of-track unbalance forces than any thrust inclination differences due to coning. This fact makes the lag angle track indication method applicable to any rotor equipped with lead-lag hinges even though the blades of such rotor have substantial amounts of elastic coning.

Referring particularly to the rotor 12, it has been pointed out that the two blades 20 and 22 move about the lead-lag axes at 46 and 48. Assuming that the rotor is being power driven and that the blades have uniformity of lift, said blades will equally lag relatively to the hub member and will have equal average positions behind those shown in Fig. 2, but the position of each blade relatively to the hub member changes cyclically throughout each rotation thereof. The cyclic changes in the positions of the blades are due to various factors and it is not necessary to fully explain and evaluate these factors. It is pointed out, however, that said changes are out of phase, and that for a two-bladed rotor the changes are 180° apart. This will be fully apparent from the chart in Fig. 9 which is entirely schematic and is not intended to represent actual angular values. The full lines 20 and 22 represent the positions of the blades of the rotor 12 with respect to the hub member 40 when the blades extend in the direction of flight as indicated by the arrows F, F. The blades are at their average lag angles *a*, *a*. When the hub has moved 90° the forwardly moving blade 20 may lead its average position by the angle *b* and the rearwardly moving blade 22 may lag behind its average position by the angle *c*. Each blade follows the same pattern and during each rotation each blade is successively in the four positions shown in Fig. 9. However, the relative movements of said blades are opposite in phase. The disclosed blade relationships and movements are merely representative and they may vary considerably with varying conditions of flight.

The relative lag-lead movements of the blades with respect to the hub member are further illustrated in Fig. 10. Assuming uniformity of lift, the line A represents the average lag angle of both blades. The line M represents the cyclic variations of the master blade 22 from said average angle, and the line S represents the cyclic variations of the slave blade 20 from said average angle. It will be clear that said cyclic variations in angle are in opposite phase, the lines M and S crossing each other at uniformly spaced points P, P. It will be understood that the curves M and S are merely schematic and are not intended to represent actual angles or values.

When the blades have uniformity of lift as has been assumed in connection with Figs. 9 and 10, each blade at any one rotative position has the same amount of lag or lead as each other blade when the hub is in the same rotative position. However, if the slave blade 20 has a lift greater than that of the master blade 22, said slave blade offers greater aerodynamic resistance to rotation and in each rotative position of the hub lags behind the corresponding position of the master blade. Similarly, if the slave blade has a lift lesser than that of the master blade, said slave blade offers lesser resistance to rotation and in each rotative position of the hub leads the corresponding position of the master blade. The lagging or leading of said slave blade is an indication or measure of the greater or lesser lift thereof, and it is this greater or lesser lift or this lift difference that results in unbalance. Suitable means is provided for utilizing said lagging or leading of said slave blade resulting from the lift difference thereof to indicate said lift difference and the direction thereof, that is, whether the lift of the slave blade is too much or too little. This indication of the direction of lift difference shows the direction of the required lift correction. The last said means may be also used to automatically cause the control means to effect the required lift correction.

Preferably a means is provided to measure the lag angle of the master blade, and this means may be either mechanical or electrical. Each of the slave blades is also provided with a means of measuring the lag angle. The measured lag angle on each of these slave blades is then compared with the measured lag angle of the master blade. If the average lag angle of a slave blade is less than that of the master blade, the collective pitch of the blade is too low, and the blade is low trackwise. If the average lag angle of a slave blade is greater than that of the master blade, the collective pitch of the blade is too high, and the blade is high trackwise. In this manner unbalance information as to all of the blades of the rotor can be obtained.

As shown there is provided an electrical system which includes electrical devices carried by the hub of each rotor and associated respectively with the blades thereof. Each of the said electrical devices is preferably a "synchro," which is a device having some of the characteristics of a transformer, but having its primary and secondary coils or windings so mounted that they are relatively movable angularly with the result that for any selected primary current the character of the resultant secondary current or signal varies with variations in the angular relationship.

As hereinafter more fully explained, there are provided first and second electrical synchros 136 and 138 each comprising primary and secondary units having windings. At least one of the units of each synchro is movable relatively to the other unit thereof and the movable unit of the first synchro 136 has a normal relationship with the movable unit of the second synchro 138. This normal relationship exists when there is no unbalance and it exists at least once during each rotor rotation.

The two synchros 136 and 138 may be variously positioned and variously actuated, but as shown in Figs. 1, 2 and 4 they are associated with the slave and master blades 20 and 22 of the rotor 12 and they are carried by the hub member 40. Two similar synchros 140 and 142 for the slave and master blades 24 and 26 are carried by the hub member 40 of the rotor 14. When each rotor has more than two blades, there is more than one slave blade and the second synchros 138 are duplicated for the additional slave blades as hereinafter more fully explained. The first and second synchros 136 and 138 will be briefly described and their connected parts will be more fully described, it being understood that the synchros 140 and 142 and their connected parts are similar.

The synchros 136 and 138 are associated respectively with the lead-lag hinge pin 46 for the slave blade 20 and the lead-lag hinge pin 48 for the master blade 22. The synchros 136 and 138 are or may be of conventional construction and they are shown schematically in Fig. 11. More specifically described, each synchro includes an outer housing 144 concentric with the axis of the corresponding hinge pin and said housing is rigidly connected with the hub member 40. Each synchro has an inner core positioned within the housing 144 and connected with the corresponding hinge pin for rotative or oscillatory movement therewith relatively to the hub member. Each inner core portion includes a movable winding or coil, the movable coil for the synchro 136 being designated as 146 and the movable coil for the synchro 138 being designated as $146^a$. The core coil for at least one of the synchros is angularly adjustable relatively to its lead-lag hinge pin for a reason to be stated. A suitable means, not shown, is provided for locking the last said coil in adjusted position. Either or both coils may be so adjustable, but for convenience of explanation it will be assumed that it is the coil $146^a$ for the master blade 22 that is adjustable.

As shown in Fig. 11, the winding or coil 146 of the synchro 136 for the slave blade 20 is connected with conductors 148 and 149 included in said cable 112 and serving through additional slip rings and brushes and conductors 150 and 151 to connect said coil with a suitable source of low voltage alternating current on the fuselage, which may be 26 volts, 400 c.p.s. The coil 146 when so connected is the primary coil of the synchro. The voltage across the ends of the coil 146 or between the conductors 148 and 150 is indicated by $v$.

As also shown in Fig. 11, each synchro housing 144 carries three symmetrically disposed stator windings which are adjacent the corresponding core coil, said windings being connected with each other at their inner ends and being connected with suitable conductors at their outer ends. Said stator windings for the synchro 136 are designated 152, 154 and 156 and these are the secondary windings of the synchro. The stator windings for the synchro 138 are designated $152^a$, $154^a$ and $156^a$. The corresponding stator windings of the two synchros are connected with each other by conductors 158, 160 and 162, all carried by the rotor hub 40 but shown only in the electrical diagrams. It will be clear that when the stator windings of the two synchros are connected as shown and described the windings $152^a$, $154^a$ and $156^a$ of the synchro 138 are the primary windings thereof.

The coil $146^a$ of the synchro 138 for the master blade 22 is connected with conductors 161 and 162 which are also included in the cable 112 and which serve through additional slip rings and brushes and conductors 163 and 164 to connect the coil $146^a$ with parts on the fuselage to be hereinafter fully described. It will be evident that the coil $146^a$ is the secondary coil of the synchro 138.

As before stated, the slave and master blades oscillate cyclically relatively to the hub and in opposite phase, and when they have the same lift they have normal relationship with each other and they have the same average lag and the same average lag positions. The coils 146 and $146^a$ move angularly or oscillate in conformity with the relative oscillations of the corresponding blades, but one coil which may be the coil $146^a$ is angularly adjustable as previously stated. For establishing the correct relationship between the two coils 146 and $146^a$, the two blades are temporarily set at equal lag angles which angles are preferably the mean or average lag angles or approximations thereof. The blades may not have exactly equal lifts, but for purposes of the initial setting it is assumed that they do have equal lifts. The coil 146 of the synchro 136 for the slave blade is in a position in definite relationship to the stator windings 152, 154 and 156 of said synchro. Current is supplied to the coil 146 through the conductors 148 and 149 and as a result of said current, voltages $e^1$, $e^2$ and $e^3$ are induced in the stator windings 152, 154 and 156 and these voltages are applied to the corresponding stator windings $152^a$, $154^a$ and $156^a$ of the synchro 138 for the master blade. The voltages in the last said windings tend to produce a voltage $e^4$ across the ends of the coil $146^a$ of the said synchro or between the conductors 161 and 162, which voltage is variable from zero to a maximum in accordance with the angular relationship between the last said windings and the last said coil. With the coil 146 in the said definite position in relation to its stator windings, the coil $146^a$ is adjusted relatively to its windings and relatively to its lead-lag hinge pin 48 to a position wherein the voltage $e^4$ therein is zero. Thereupon the coil $146^a$ is locked in fixed relationship to said pin 48. With a two-bladed rotor the same result can be obtained by angularly adjusting the coil 146 of the master synchro 136.

As the result of the described adjusted relationship between the coils 146 and $146^a$, the voltage in the coil $146^a$ is always zero whenever the blades are at the selected equal or average lag angles. However, the said equal or average lag angles are not maintained and the lag angle of each blade is increased and decreased during each rotation as previously stated. Still assuming equality of lift, the blades will relatively oscillate to the same extent from the said equal or average lag angles and the voltage $e^4$ will vary cyclically between a positive maximum and a negative maximum passing through zero twice during each revolution.

The oscillations of the blades and the variations in the voltage $e^4$ will be evident from the chart in Fig. 10 which has already been briefly described. Assuming equality of lift, the curve M indicates the cyclic variations in the lag-lead angle of the master blade 22 from its average angle indicated by the line A, and the curve S indicates the cyclic variation in the lag-lead angle of the slave blade 20 from its average angle indicated by said line A. With equality of lift the two curves M and S are identical except as to phase. They cross each other at equally spaced average positions P, P twice during each rotor rotation, the average positions being on said line A. The voltage $e^4$ varies as the blades oscillate and the curve S representing the varying lead-lag angle of the slave blade 20 can be considered as also representing said varying voltage $e^4$. When said blade 20 is at said average positions P, P, said voltage is zero as previously explained, and with equality of lift both blades are at said average positions at the same times.

If the slave blade 20 has a lift greater or lesser than that of the master blade 22, said slave blade will lag or lead and its variations from the average line A will be as indicated respectively by the dotted curves S′ and S″. If the slave blade has a greater lift and resultantly lags, zero voltage at $e^4$ is reached at points G, G on said line A, but said points G, G are not uniformly spaced. The voltage $e^4$ at points P′, P′, opposite the points P, P, and on a line A′ will not be zero but will have a discrete value. Similarly, if the slave blade has a lesser lift and therefore leads, zero voltage at $e^4$ is reached at points L, L on said line A but said points are not uniformly spaced. The voltage $e^4$ at points P″, P″ opposite the points P′, P′ will not be zero but will have a discrete value with its phase opposite to that of the voltage value for the points P′, P′. This opposite voltage $e^4$ at said points P′, P′ and P″, P″ constitutes a signal which corresponds to the greater or lesser lift of the slave blade 20 and which is utilized, according to its phase, for indicating the direction difference in lift and the direction of the required correction or is so utilized for automatically causing the control means to effect said correction.

Assuming that the slave blade 20 has a greater or lesser lift and resultantly lags or leads, the signal represented by the voltage $e^4$ varies cyclically during each revolution and has its average value at the points P′, P′ or the points P″, P″ which are on the line A′ or on the line A″. The polarity of the average signal is dependent upon direction of the lift difference and resultantly upon the lagging or leading of the slave blade. In order that the signal $e^4$ may be utilized, the cyclic one-per-revolution variations therein must be eliminated. Before this component can be eliminated, the signal must be converted to direct current. The conversion is effected by means of a suitable rectifier 166 preferably located on the fuselage as indicated in Fig. 1. The rectifier 166 is preferably a synchronous chopper as shown in Fig. 11. A filter network 167 is associated with the rectifier, this network serving for the elimination of the cyclic component of the voltage.

Referring more particularly to Fig. 11, the rectifier or chopper comprises a single pole double throw switch having a movable contact 168 connected with the conductor 163 and operable by the movable core of a solenoid 170. The contact 168 is engageable with stationary contacts 172, 174 connected respectively with conductors 176, 178. The movable contact 168 moves from one to the other of said contacts 172, 174 in accordance with the frequency of current supplied to said solenoid 170. The solenoid is excited by the same current that excites the synchro coil 146 and the result is that direct current rather than alternating current is supplied to the conductors 176, 178.

The conductor 164 and said conductors 176, 178 are connected with conductors 180, 182 by means of the said filter network 167 comprising resistances and condensers $R^1$, $C^1$, $R^2$, $C^2$. The filter network eliminates the cyclic one-per-revolution component of the voltage $e^4$ and delivers a steady voltage signal $e^5$ to the conductors 180 and 182, said signal having a polarity dependent upon the direction of the lift difference which results in the lagging or leading of the slave blade 20. For simplicity of explanation it is assumed that the voltage $e^5$ is positive when the slave blade has a greater lift and therefore lags and that the voltage $e^5$ is negative when the slave blade has a lesser lift and therefore leads.

The voltage $e^5$ is applied to a null-center indicating device 184 having a solenoid 186. Said device has a member 188 which is movable by the core of the solenoid 186 between two positions $188^a$ and $188^b$ according to the polarity of the signal $e^5$ and these may be upper and lower positions. When the signal $e^5$ is zero, the member 188 is in a central position. The member 188 is within the range of observation of the pilot at said pilot position 31 and if said member is in a position other than its central position the pilot is warned that there is unbalance in the lift of the blades. The position of the member 188 indicates the direction of the unbalance, and the upper position may indicate too large a lift for the slave blade and the lower position may indicate too small a lift for the slave blade. Then the pilot, knowing what direction of correction is required, effects such correction by means of the handle 128 and the step switch 124. The correction is continued until the member 188 moves to its central position, thus indicating that uniformity of lift has been attained. The indicator member 188 and the handle 128 are preferably adjacent each other as shown in Fig. 11, and they are in any event both readily available to the pilot in his normal pilot position at 31.

*Automatic means for correcting lift differences and unbalance—Fig. 12*

In order that the pilot may be relieved of the burden of manually correcting unbalance, it may be preferred to substitute a null-center relay 190 for the null-center indicator device 184. This relay and related parts are shown in Fig. 12.

The relay has a movable contact 192 operable by the relay solenoid 194, which is connected in the same manner as the solenoid 186 of the device 184. This movable contact may be regarded as also constituting an indicating device. The relay 190 has stationary contacts 196, 198. Said movable contact 192 is connected with a conductor 200 extending from a suitable current source of direct current. When the signal $e^5$ is zero, the contact 192 is in its intermediate position as shown. Positive voltage at $e^5$ moves the contact 192 into engagement with one of the contacts 196, 198 and this may be the upper contact 196. Negative voltage at $e^5$ moves the contact 192 into engagement with the other contact 198.

The contacts 196, 198 are connected by conductors 202, 204 with a reversible direct current servo-motor 206 which is operated in one direction or the other according to the polarity of the voltage in the null-center relay 190, the polarity of said voltage being dependent on the lagging or leading of the slave blade 20 as previously explained. By means of speed reducing gearing in a box 208, the motor 206 is connected to the shaft 130 for operating the step switch 124. The step switch is operated in one direction or the other to operate the blade lift adjusting mechanism until the null-center relay 190 moves to central position, this taking place when the required blade adjustment has been completed.

*Automatic means for correcting lift differences or unbalance in a rotor having more than two blades—Fig. 13*

Figs. 1 to 12 of the drawings and the prior detailed description relate more specifically to two-bladed rotors, but it has been stated that the lift adjustment mechanism is duplicated for each additional slave blade of a rotor having more than two blades. A representative three-bladed rotor with lift adjusting mechanisms for two slave blades is shown in Figs. 12 to 14 of said Emmerson and Polleys application Serial No. 539,718.

For a rotor having three or more blades some of the parts shown in Fig. 11 are also duplicated, and this is illustrated in Fig. 13, a three-bladed rotor having been selected as representative. A detailed description is unnecessary, but it will be observed that there is one master blade synchro 136 and two slave blade synchros 138, 138. There are two rectifiers or synchronous choppers 166, 166 connected respectively with the synchros 138, 138 for the two slave blades, and there are two filter networks 167, 167 connected with the rectifiers. There are two null-center relays 190, 190 connected respectively with the filter networks and two servo-motors 206, 206 connected respectively with the two relays 190, 190. The motors are connected respectively with the two shafts 130, 130 of two control means, each of which may be identical with that shown in Fig. 8. The manner of operation for each additional slave blade is the same as already described and repetition is unnecessary.

If full automatic operation is not required, it will be obvious that indicator devices 188 as shown in Fig. 11 can be substituted for the relays 190, 190 as shown in Fig. 13, these devices being in the range of observation of the pilot in said pilot position 31. The motors 206, 206 as shown in Fig. 13 can be omitted, and the two shafts 130, 130 can be provided respectively with two handles 128, both handles being within reach of the pilot. With this arrangement the pilot can observe from the two indicator devices which slave blade is out of balance and can observe the required direction of adjustment. The actual adjustments can be effected by means of the handles 128 as previously described.

*Alternative means for indicating lift differences or unbalance—Figs. 14 to 18*

It has been pointed out that the unbalance or lift difference that requires correction results in the relative movement of at least one blade away from or out of a normal relationship with the shaft or with another blade. Use is made of the said relative movement, ordinarily pivotal, for indicating the direction of the unbalance or lift difference or for automatically effecting the necessary operation of the control means to cause the lift adjusting mechanism to correct said unbalance or lift difference.

In the specific embodiment of the invention hereinbefore described the different relative movement of a blade about its lag hinge axis is utilized to correct the lift difference.

In the alternative embodiment of the invention to be now described, each blade is movable or adjustable about a teetering or coning axis which is horizontal or approximately so and which is at a substantial angle to the blade length. When a slave blade has a lift different from that of the master blade, said slave blade has a movement or adjustment about its said axis different from that of the master blade. This different pivotal movement or adjustment of the slave blade is utilized for indicating or correcting the lift difference.

In the helicopter as illustrated in Fig. 14, each rotor has only two blades and these are connected with each other for movement or adjustment in unison about the same axis, this axis being the teetering axis at 38.

The helicopter, as fragmentarily shown in Fig. 14, is or may be exactly like the helicopter shown in Figs. 1 to 4 except for the electrical control devices. The lift adjusting mechanism for the slave blade of each rotor is or may be exactly like that shown in Figs. 4 to 8.

Referring particularly to the rotor 12 as shown in Fig. 14 and assuming that said rotor is power driven and further assuming exact uniformity of lift between the blades 20 and 22 and also assuming that the helicopter is hovering with the blades at uniform pitches, it will be apparent that the blades will have equal coning angles and will move in the same horizontal paths. When the slave and master blades are connected for movement in unison about a common teetering axis, there will be no movement or adjustment about said axis.

If a slave blade has a greater or lesser lift, it will move in a path higher or lower than that of the master blade. When the slave and master blades are connected for movement in unison about a teetering axis such as that at 38, the blades and the hub will adjust themselves about said teetering axis so that the slave blade moves in a path higher or lower than normal and so that the master blade moves in a path lower or higher than normal.

During flight and as the result of various factors including the direction of flight and the cyclic pitch changes, the rotor including the hub and the blades has cyclic oscillatory movement about the teetering axis. With uniformity of lift, the slave and master blades will oscillate between the same upper and lower limiting positions and will have the same average oscillative positions, said average positions being at equal coning angles and being the same as the angles in the above-described hovering positions. However, if the slave blade has a lift greater or lesser than that of the master blade, its upper and lower limiting positions and its average position will be above or below those of the master blade. The higher or lower average oscillative position of said slave blade is a measure of the greater or lesser lift thereof, and it is this greater or lesser lift or lift differential that results in unbalance. Said higher or lower average oscillative position of said slave blade resulting from the different lift thereof is utilized to indicate the unbalance or lift differential and the direction thereof. Preferably the last said means also serves for automatically causing the adjusting mechanism to correct said unbalance or lift difference.

Figures 17, 18:
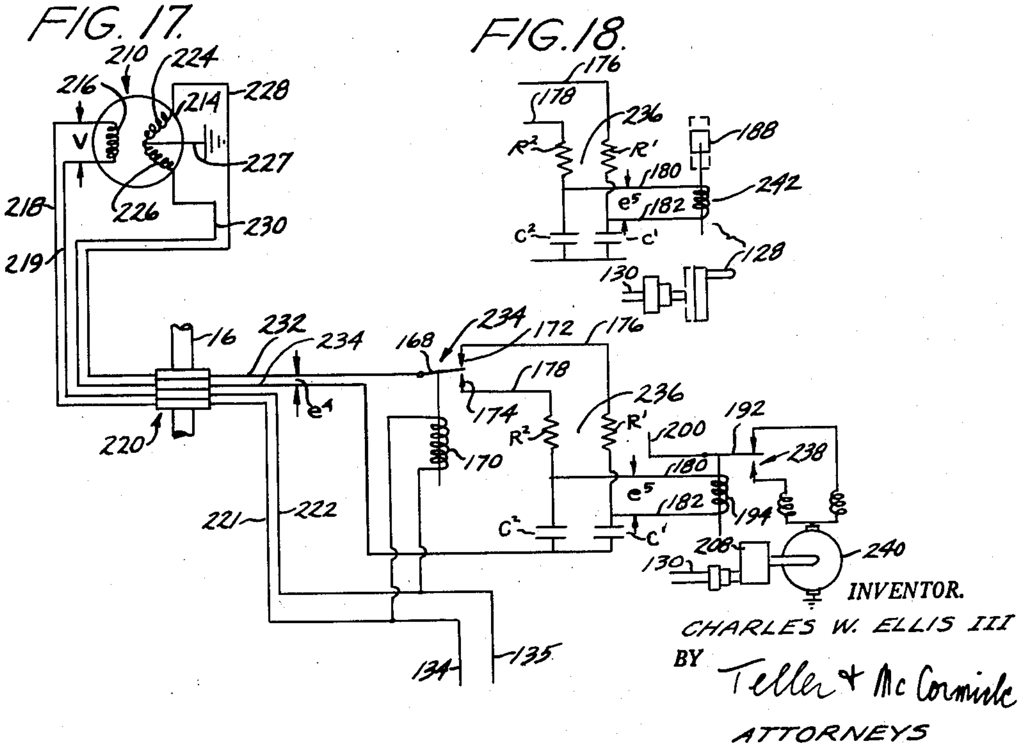
Fig. 17 is a diagram of electrical connections generally similar to Fig. 12 but adapted for the said alternative mechanism.
Fig. 18 is a fragmentary electrical diagram similar to Fig. 17 but omitting the electrical and mechanical connections for the automatic means for correcting lift differences and showing a pilot observable indicator.

Utilization of the differing average coning or teetering angle for indicating or correcting unbalance may be variously effected, but as shown there is provided for this purpose an electrical system which includes an electrical device such as a synchro for indicating the coning position of each slave blade. When the slave and master blades are movable in unison about a common teetering axis, there is a single synchro carried by the hub of each rotor at said teetering axis. For a helicopter of the type shown having two rotors, there is a synchro 210 carried by the hub member 40 of the rotor 12 and a similar synchro 212 is carried by the hub member 40 of the rotor 14. The synchros are shown in Figs. 14 and 17. The synchro 210 and its connected parts will be fully described, it being understood that the synchro 212 and its connected parts is similar.

The synchro 210 is associated with the teeter pin 38 for the rotor 12. The synchro 210 is or may be of conventional construction and it is shown schematically in Fig. 17, it being somewhat different from the previously described synchros 136 and 138. The synchro has an outer housing 214 concentric with the teetering axis and said housing is rigidly connected with the hub member 40 for oscillatory movement therewith. The synchro has an inner core positioned within the housing 214 and connected with the teetering pin so as to be held against oscillatory movement. The inner core portion includes a coil 216, said coil being angularly adjustable relatively to said teetering pin for a reason to be stated. A suitable means, not shown, is provided for locking the last said coil in adjusted position. As shown in Fig. 17, the coil 216 of the synchro 210 is connected with conductors 218 and 219 included in a rotatable cable similar to the cable 112 but not shown. Said conductors are connected through slip rings and brushes 220 and conductors 221 and 222 with a suitable source of low voltage alternating current in the fuselage. The voltage across the ends of the coil 216 or between the conductors 218 and 219 is indicated by $v$. The synchro housing 214 carries two stator windings 224 and 226 which are adjacent the core coil 216, said windings at their inner ends being connected with each other and with a grounding conductor 227. At their outer ends the stator windings 224 and 226 are connected with conductors 228 and 230, the last said conductors being included in the last said rotatable cable and connected through said slip rings 220 with conductors 232 and 234 on the fuselage.

Primary current is supplied to the coil 216 and as a result of said primary current, voltages are induced in the stator windings 224 and 226 which produce a secondary current in the conductors 228 and 230 having a voltage $e^4$, which voltage is variable from zero to a maximum in accordance with the angular relationship between said primary coil and the secondary stator windings.

As before stated, the blades and the hub member oscillate cyclically on the teetering pin 38, and when the two blades have the same lift their average oscillative positions are at equal coning angles. For establishing the correct relationship between the synchro parts, the blades are temporarily set at equal coning angles. The blades may not have exactly equal lifts, but for purposes of the initial setting it is assumed that they do have equal lifts. With the blades and the stator windings in the stated positions, the coil 216 is adjusted relatively to said windings and relatively to the teetering pin 38 to a position wherein the voltage $e^4$ is zero. Thereupon the coil 216 is locked in fixed relationship to said pin 38.

As the result of the described adjusted relationship between the coils 216 and the windings 224 and 226, the voltage $e^4$ between the conductors 226 and 228 is always zero whenever the blades are at the said equal average oscillative positions. However, the said average oscillative positions are not maintained and the coning angle of each blade is increased and decreased during each rotation as previously stated. Still assuming equality of lift, the blades will relatively oscillate to the same extent from the said coning angles and the voltage $e^4$ will vary cyclically between a positive maximum and a negative maximum passing through zero twice during each revolution.

Figure 16:
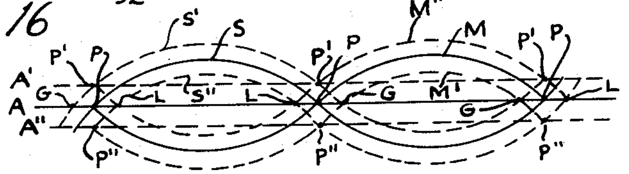
Fig. 16 is a chart illustrating the oscillatory movements of the blades of one rotor of the alternative mechanism and also showing the variations of a corresponding electrical value.

The oscillations of the blades and the variations in the voltage $e^4$ will be evident from the chart in Fig. 16. Assuming equality of lift, the curve M indicates the cyclic oscillations of the master blade 22 from its average angle indicated by the line A, and the curve S indicates the cyclic oscillations of the slave blade 20 from its average angle indicated by said line A. It will be understood that the curves M and S are merely schematic and are not intended to represent actual angles or values. The two curves M and S are identical except as to phase. They cross each other at equally spaced average positions P, P twice during each rotor rotation, the average positions being on said line A. The voltage $e^4$ varies as the blades oscillate and either of the curves M and S representing the oscillations of one blade can be considered as also representing said varying voltage $e^4$. When said curve S is at said average positions P, P, said voltage is zero as previously explained.

If the slave blade 20 has a lift greater or lesser than that of the master blade 22, said slave blade will move in a path higher or lower than its normal path and the master blade will move in a path corresponding lower or higher than its normal path, as indicated respectively by the dotted curves S′ and S″ for the slave blade, and as represented by the curves M′ and M″ for the master blade. If the slave blade has a greater lift and a higher path, zero voltage at $e^4$ is reached at points G, G where said curves S′ and M′ intersect said line A, but said points G, G are not uniformly spaced. The voltage $e^4$ at the intersection points P′, P′, opposite the points P, P and on a line A′, will not be zero but will have a discrete value. Similarly, if the slave blade has a lesser lift and a lower path, zero voltage at $e^4$ is reached at points L, L where said curves S″ and M″ intersect said line A but said points are not uniformly spaced. The voltage $e^4$ at the intersection points P″, P″ opposite the points P′, P′ and on a line A″ will not be zero but will have a discrete value with its phase opposite to that of the voltage value for the points P′, P′. This opposite voltage $e^4$ at the points P′, P′ and P″, P″ constitutes a signal which corresponds to the greater or lesser lift of the slave blade 20 and which is utilized, according to its phase, for indicating the direction of the required correction or for automatically causing the control means to effect said correction.

Assuming that the slave blade 20 has a greater or lesser lift and therefore has a higher or lower path, the signal represented by the voltage $e^4$ varies cyclically during each revolution and has its average value at the points P′, P′, or the points P″, P″ which are on the line A′ or on the line A″. The polarity of the signal is dependent upon the higher or lower path of the slave blade. In order that the signal $e^4$ may be utilized, the cyclic one-per-revolution component of the signal must be eliminated. Before this component can be eliminated, the signal must be converted to direct current. The conversion is effected by a rectifier or synchronous chopper 234 and the elimination of said cyclic component is effected by means of a filter network 236. Said synchronous chopper and said filter network are shown in Fig. 17.

The construction and functioning of the synchronous chopper 234 are similar to those of the synchronous chopper 166 and repetition of the description is unnecessary. The filter network 236 is similar to the network 167 and further description is unnecessary. Said network delivers a steady voltage signal $e^5$, said signal having a polarity dependent upon the higher or lower path of the slave blade 20.

The voltage $e^5$ is applied to a null-center relay 238 which is or may be exactly like the null-center relay 190. Said relay controls a motor 240 like the motor 206 and similarly connected. The functioning of the relay and of the motor and of connected parts is exactly as previously described and repetition is unnecessary.

It will be understood that when full automatic operation is not required, an indicator device 242 similar to the device 188 can be substituted for the relay 238, the motor 240 and its connections being omitted. This is shown in Fig. 18. The indicator member 188 of the device 242 and the handle 128 of a manual control mechanism as shown in Fig. 8 are preferably adjacent each other as shown in said Fig. 18, and they are in any event both readily available to the pilot in his normal pilot position similar to the position 31 shown in Fig. 1.

The invention claimed is:

1. In a helicopter comprising a fuselage and a substantially vertical power driven rotatable shaft connected therewith and also comprising a rotor on said shaft including a hub and at least two similar blades connected with the hub at their inner ends, one of said blades constituting a master blade and at least one other of said blades being a slave blade and being adapted for lift adjustment relatively to said master blade, the combination with said rotor of means connected therewith and automatically responsive to any existing difference between the lift of said slave blade and that of said master blade, an indicating member located on the fuselage and movable relatively thereto, and means for operatively connecting said lift difference responsive means with said indicating member for moving it to a position which indicates the difference in blade lift as determined by said lift difference responsive means and which also indicates the direction of said lift difference so that said difference and the resulting unbalance may be corrected by lift adjustment of said slave blade in the proper direction.

2. In a helicopter comprising a fuselage and a substantially vertical power driven rotatable shaft connected therewith and also comprising a rotor on said shaft including a hub and at least two similar blades connected with the hub at their inner ends, one of said blades constituting a master blade and at least one other of said blades being a slave blade and being adapted for lift adjustment relatively to said master blade, the combination with said rotor of means automatically responsive to any existing difference between the lift of said slave blade and that of said master blade at least a portion of which means is rotatable in unison with said rotor, and a non-rotary indicating member located on the fuselage and movable relatively thereto, and means for operatively connecting said lift difference responsive means with said indicating member for moving it to a position which indicates the difference in blade lift as determined by said lift difference responsive means and which also indicates the direction of said lift difference so that said difference and the resulting unbalance may be corrected by lift adjustment of said slave blade in the proper direction.

3. In a helicopter comprising a fuselage with a pilot position thereon and comprising a substantially vertical power driven rotatable shaft connected with said fuselage and also comprising a rotor on said shaft including a hub and at least two similar blades connected with the hub at their inner ends, one of said blades constituting a master blade and at least one other of said blades being a slave blade and being adapted for lift adjustment relatively to said master blade, the combination with said rotor of means connected therewith and automatically responsive to any existing difference between the lift of said slave blade and that of said master blade, an indicating member located on the fuselage and movable relatively thereto and further located within the range of observation of a pilot at said pilot position, means for operatively connecting said lift difference responsive means with said indicating member to move it so as to indicate the difference in blade lift as determined by said lift difference responsive means and so as to also indicate the direction of said lift difference so that said difference and the resulting unbalance may be corrected by lift adjustment of said slave blade in the proper direction.

4. In a helicopter comprising a fuselage and comprising a substantially vertical power driven rotatable shaft connected with said fuselage and also comprising a rotor on said shaft including a hub and at least two similar blades connected with the hub at their inner ends, one of said blades constituting a master blade and at least one other of said blades being a slave blade and being adapted for lift adjustment relatively to said master blade, the combination with said rotor of means connected therewith and automatically responsive to any existing difference between the lift of said slave blade and that of said master blade, an indicating means connected with and controlled by said lift difference responsive means and located on the fuselage, said indicating means serving to indicate said difference in blade lift and to also indicate the direction of said difference, a mechanism carried by said rotor and connected with the slave blade thereof for adjusting the lift of said slave blade, and control means carried by the fuselage independently of said rotor and operatively connected with said adjusting mechanism on the rotor for effecting and controlling the operation of said adjusting mechanism during rotation of said rotor to effect lift adjustment of said slave blade in the direction and to the extent indicated by said indicating means.

5. In a helicopter comprising a fuselage with a pilot position thereon and comprising a substantially vertical power driven rotatable shaft connected with said fuselage and also comprising a rotor on said shaft including a hub and at least two similar blades connected with the hub at their inner ends, one of said blades constituting a master blade and at least one other of said blades being a slave blade and being adapted for lift adjustment relatively to said master blade, the combination with said rotor of means connected threwith and automatically responsive to any existing difference between the lift of said slave blade and that of said master blade, an indicating means connected with and controlled by said lift difference responsive means and located on the fuselage within the range of observation of a pilot at said pilot position, said indicating means serving to indicate said difference in blade lift and to also indicate the direction of said difference, a mechanism carried by said rotor and connected with the slave blade thereof for adjusting the lift of said slave blade, and control means carried by the fuselage independently of said rotor and operatively connected with said adjusting mechanism on the rotor for effecting and controlling the operation of said adjusting mechanism during rotation of said rotor, the last said means including a pilot operable member located adjacent said pilot position and enabling the pilot to effect lift adjustment of said slave blade in the direction and to the extent indicated by said indicating means.

6. In a helicopter comprising a fuselage and comprising a substantially vertical power driven rotatable shaft connected with said fuselage and also comprising a rotor on said shaft including a hub and at least two similar blades connected with the hub at their inner ends, one of said blades constituting a master blade and at least one other of said blades being a slave blade and being adapted for lift adjustment relatively to said master blade, the combination with said rotor of means connected therewith and automatically responsive to any existing difference between the lift of said slave blade and that of said master blade, an indicating means connected with and controlled by said lift difference responsive means and located on the fuselage, said indicating means serving to indicate said difference in blade lift and to also indicate the direction of said difference, a mechanism carried by said rotor and connected with the slave blade thereof for adjusting the lift of said slave blade, control means carried by the fuselage independently of said rotor and operatively connected with said adjusting mechanism on the rotor for effecting and controlling the operation of said adjusting mechanism during rotation of said rotor, and mechanism enabling said indicating means to automatically cause the operation of said control means to effect lift adjustment of said slave blade in the direction and to the extent required for lift equalization.

7. In a helicopter comprising a fuselage and a substantially vertical power driven rotatable shaft connected therewith and also comprising a rotor on said shaft including a hub and at least two similar blades connected with the hub at their inner ends, one of said blades constituting a master blade and at least one other of said blades being a slave blade and being adapted for lift adjustment relatively to said master blade which slave blade during rotation and as the result of a different lift is relatively movable to an average position with respect to said shaft different from that of the master blade, the combination with said rotor of means located at least partly thereon and rotatable therewith and automatically responsive to movement of said slave blade to an average position different from that of said master blade, a nonrotary indicating member located on the fuselage and movable relatively thereto, and means for operatively connecting said blade movement responsive means with said indicating member for moving it to a position which indicates the difference in blade lift that resulted in the relative movement of the slave blade to said different average position and which also indicates the direction of said difference in blade lift so that said difference may be corrected by lift adjustment of said slave blade in the proper direction.

8. In a helicopter comprising a fuselage and a substantially vertical power driven rotatable shaft connected therewith and also comprising a rotor on said shaft including a hub and at least two similar blades connected with the hub at their inner ends, one of said blades constituting a master blade and at least one other of said blades being a slave blade and being adapted for lift adjustment relatively to said master blade which slave blade during rotation and as the result of a lift different from that of the master blade is pivotally movable differently from said master blade and relatively to the shaft about an axis at a substantial angle to the blade length, the combination with said rotor of means located at least partly thereon and rotatable therewith and automatically responsive to said pivotal movement of said slave blade different from that of said master blade, a nonrotary indicating member located on the fuselage and movable relatively thereto and means for operatively connecting said blade movement responsive means with said indicating member for moving it to a position which indicates the difference in blade lift that resulted in the last said different pivotal blade movement and which also indicates the direction of said difference in blade lift so that said difference may be corrected by lift adjustment of said slave blade in the proper direction.

9. In a helicopter comprising a fuselage and a substantially vertical power driven rotatable shaft connected therewith and also comprising a rotor on said shaft including a hub and at least two similar blades connected with the hub at their inner ends, one of said blades constituting a master blade and at least one other of said blades being a slave blade and being adapted for lift adjustment relatively to said master blade which slave blade during rotation and as the result of a lift different from that of the master blade is pivotally movable differently from said master blade and relatively to the shaft about an axis at a substantial angle of the blade length, the combination with said rotor of an electrical device located at least partly thereon and rotatable therewith and automatically responsive to said pivotal movement of said slave blade different from that of said master blade, an electrically actuated indicator on the fuselage, and electrical connections between said electrical device on the rotor and said electrically actuated indicator for causing the latter to indicate the difference in blade lift that resulted in the last said different relative pivotal blade movement and to also indicate the direction of said difference in blade lift so that said difference may be corrected by lift adjustment of said slave blade in the proper direction.

10. In a helicopter comprising a fuselage and a substantially vertical power driven rotatable shaft connected therewith and also comprising a rotor on said shaft including a hub and at least two similar blades connected with the hub at their inner ends one of which blades constitutes a master blade and at least one other of which blades is a slave blade and is adapted for lift adjustment relatively to said master blade, each of said blades during rotation being pivotally movable relatively to the shaft about an axis at a substantial angle to the blade length and said slave blade as the result of a lift different from that of the master blade having its pivotal movement different from that of the master blade, the combination with said rotor of an electrical synchro located at least partly thereon and comprising relatively movable primary and secondary units having windings, one of said units being connected for pivotal movement in unison with said slave blade and the other of said units being fixed against the last said pivotal movement, an electrically actuated indicator on the fuselage, and means including electrical connections to the primary synchro unit and from the secondary synchro unit to said indicator for generating a secondary electrical current and for transmitting the said secondary current to said indicator, the voltage of said secondary current being dependent upon the relationship between said primary and secondary synchro units and being therefore dependent upon said different pivotal movement of said slave blade with the result that said indicator is moved in accordance with said different pivotal movement and the different lift of the slave blade.

11. A helicopter as set forth in claim 10, wherein one unit of said synchro is rotatably adjustable about the pivotal axis so that the voltage of said secondary current is zero when the pivotal position of the slave blade is the same as that of the master blade.

12. In a helicopter comprising a fuselage and a substantially vertical power driven rotatable shaft connected therewith and also comprising a rotor on said shaft including a hub and at least two similar blades connected with the hub at their inner ends one of which blades constitutes a master blade and at least one other of which blades is a slave blade and is adapted for lift adjustment relatively to said master blade, each of said blades during rotation having normal cyclical pivotal movements relatively to the shaft about an axis at a substantial angle to the blade length and said slave blade as the result of a lift different from that of the master blade having its said cyclical pivotal movements different from those of the master blade, the combination with said rotor of an electrical synchro located at least partly thereon and comprising relatively movable primary and secondary units having windings, one of said units being connected for oscillation in unison with said slave blade and the other of said units being fixed against the last said pivotal movement, means for supplying alternating current to the synchro primary winding with the resultant generation in the synchro secondary winding of an alternating secondary current cyclically varying in voltage and dependent upon the varying relationship between said synchro units and therefore dependent upon said different cyclical pivotal movement of said slave blade with the result that the average positive or negative voltage of said current represents said different movement of the last said blade and the greater or lesser lift thereof, means for rectifying the last said alternating current to direct current, a filter network for eliminating the cyclic changes in said voltage with the result that said average positive or negative voltage remains, and an indicator for indicating the said positive or negative voltage and for thus indicating greater or lesser lift of said slave blade.

13. In a helicopter comprising a fuselage with a pilot position thereon and comprising a substantially vertical power driven rotatable shaft connected therewith and also comprising a rotor on said shaft including a hub and at least two similar blades connected with the hub at their inner ends, one of said blades constituting a master blade and at least one other of said blades being a slave blade and being adapted for lift adjustment relatively to said master blade which slave blade during rotation and as the result of a lift different from that of the master blade is pivotally movable differently than said master blade and relatively to the shaft about an axis at a substantial angle to the blade length, the combination with said rotor of means located at least partly thereon and rotatable therewith and automatically responsive to said different relative pivotal movement of said slave blade, an indicating means connected with and controlled by said blade movement responsive means and located on the fuselage within the range of observation of a pilot at said pilot position, said indicating means serving to indicate the difference in blade lift that resulted in said different relative blade movement and to also indicate the direction of said difference, a mechanism carried by said rotor and connected with the slave blade thereof for adjusting the lift of said slave blade, and control means carried by the fuselage independently of said rotor and operatively connected with said adjusting mechanism on the rotor for effecting and controlling the operation of said adjusting mechanism during rotation of said rotor, the last said means including a pilot operable member located adjacent said pilot position and enabling the pilot to effect lift adjustment of said slave blade in the direction and to the extent indicated by said indicating means.

14. In a helicopter comprising a fuselage and a substantially vertical power driven rotatable shaft connected therewith and also comprising a rotor on said shaft including a hub and at least two similar blades connected with the hub at their inner ends, one of said blades constituting a master blade and at least one other of said blades being a slave blade and being adapted for lift adjustment relatively to said master blade which slave blade during rotation and as the result of a lift different from that of the master blade is pivotally movable differently than said master blade and relatively to the shaft about an axis at a substantial angle to the blade length, the combination with said rotor of means located at least partly thereon and rotatable therewith and automatically responsive to said different relative pivotal movement of said slave blade, an indicating means connected with and controlled by said blade movement responsive means and located on the fuselage, a mechanism carried by said rotor and connected with the slave blade thereof for adjusting the lift of said slave blade, control means carried by the fuselage independently of said rotor and operatively connected with said adjusting mechanism on the rotor for effecting and controlling the operation of said adjusting mechanism during rotation of said rotor, and mechanism connected with said indicating means for enabling the last said means to automatically cause the operation of said control means to effect lift adjustment of said slave blade in the direction and to the extent required for lift equalization.

15. In a helicopter comprising a fuselage and a substantially vertical power driven rotatable shaft connected therewith and also comprising a rotor on said shaft including a hub and at least two similar blades connected with the hub at their inner ends for movement about lead-lag axes substantially parallel to said shaft, one of said blades constituting a master blade and at least one other of said blades being a slave blade and being adapted for lift adjustment relatively to said master blade and said slave blade during rotation and as the result a different aerodynamic lift thereof being differently movable about its lead-lag axis, the combination with said rotor of means located at least partly thereon and rotatable therewith and automatically responsive to said different relative movement of said slave blade about its said lead-lag axis, and a nonrotary means located on the fuselage and connected with and controlled by said blade movement responsive means and serving to indicate the difference in blade lift that resulted in said different relative blade movement of said slave blade about its said lead-lag axis and to also indicate the direction of said difference in blade lift so that said difference may be corrected by lift adjustment of said slave blade in the proper direction.

16. In a helicopter comprising a fuselage and a substantially vertical power driven rotatable shaft connected therewith and also comprising a rotor on said shaft including a hub and at least two similar blades connected with the hub at their inner ends for movement about lead-lag axes substantially parallel to said shaft, one of said blades constituting a master blade and at least one other of said blades being a slave blade and being adapted for lift adjustment relatively to said master blade and said slave blade during rotation and as the result a different aerodynamic lift thereof being differently movable about its lead-lag axis, the combination with said rotor of electrical devices located at least partly thereon and rotatable therewith and automatically responsive to said different relative movement of said slave blade about its said lead-lag axis, an electrically actuated indicator on the fuselage, and electrical connections between said electrical devices on the rotor and said electrically actuated indicator for causing the latter to indicate the difference in blade lift that resulted in said different relative blade movement of said slave blade about its said lead-lag axis and to also indicate the direction of said difference in blade lift so that said difference may be corrected by lift adjustment of said slave blade in the proper direction.

17. In a helicopter comprising a fuselage and a substantially vertical power driven rotatable shaft connected therewith and also comprising a rotor on said shaft including a hub and at least two similar blades connected with the hub at their inner ends for movement about lead-lag axes substantially parallel to said shaft, one of said blades constituting a master blade and at least one other of said blades being a slave blade and being adapted for lift adjustment relatively to said master blade and said slave blade during rotation and as the result a different aerodynamic lift thereof being differently movable about its lead-lag axis, the combination with said rotor of at least two electrical synchros located respectively adjacent the axes of said master and slave blades, each synchro comprising relatively movable primary and secondary units having windings, one of said units of each synchro being connected for pivotal movement in unison with the corresponding blade and the other of said units being fixed against the last said pivotal movement, means for electrically connecting the windings of said fixed units with each other, an electrically actuated indicator on the fuselage, and means including electrical connections to the movable synchro unit for the master blade and from the movable synchro unit for the slave blade to said indicator for generating a secondary electrical current and for transmitting the said secondary current to said indicator, the voltage of said secondary current being partly dependent upon the relationship between said two pivotally movable synchro units and being therefore partly dependent upon said different pivotal movement of said slave blade about its lead-lag axis with the result that said indicator is moved in accordance with said different pivotal movement and the different lift of the slave blade.

18. A helicopter as set forth in claim 17, wherein one unit of one synchro is rotatably adjustable about the corresponding pivotal axis so that the voltage of said secondary current is zero when the pivotal position of the slave blade is the same as that of the master blade.

19. In a helicopter comprising a fuselage and a substantially vertical power driven rotatable shaft connected therewith and also comprising a rotor on said shaft including a hub and at least three similar blades connected with the hub at their inner ends for movement about lead-lag axes substantially parallel to said shaft, one of said blades constituting a master blade and at least two others of said blades being slave blades and being adapted for lift adjustment relatively to said master blade and said slave blades during rotation and as the result of a different aerodynamic lift thereof being movable about their lead-lag axes differently from said master blade, the combination with said rotor of at least three electrical synchros located respectively adjacent the axes of the several blades, each synchro comprising relatively movable primary and secondary units having windings, one of said units of each synchro being connected for pivotal movement in unison with the corresponding blade and the other of said units being fixed against the last said pivotal movement, means for electrically connecting the windings of said fixed units with each other, at least two electrically actuated indicators on the fuselage, and means including electrical connections to the movable synchro unit for the master blade and respectively from the movable synchro units for the slave blades to said indicators for generating secondary electrical currents and for transmitting the said secondary currents to said indicators, the voltage of each said secondary current being partly dependent upon the relationship between said movable synchro unit for the master blade and the movable synchro unit for the corresponding slave blade and being therefore partly dependent upon said different pivotal movement of said corresponding slave blade about its lead-lag axis with the result that the corresponding indicator is moved in accordance with said different pivotal movement and the different lift of said corresponding slave blade.

20. In a helicopter comprising a fuselage and a substantially vertical power driven rotatable shaft connected therewith and also comprising a rotor on said shaft including a hub and at least two similar blades connected with the hub at their inner ends for movement about lead-lag axes substantially parallel to said shaft one of which blades constitutes a master blade and at least one other of which blades constitutes a slave blade and is adapted for lift adjustment relatively to said master blade, each of said blades during rotation having normal cyclical pivotal movements relatively to the hub about said lead-lag axes and said slave blade as the result of a lift different from that of the master blade having its said cyclical pivotal movements different from those of the master blade, the combination with said rotor of at least two electrical synchros located respectively adjacent the axes of said master and slave blades, each synchro comprising relatively movable primary and secondary units having windings one of which units is connected for pivotal movement in unison with the corresponding blade and the other of which units is fixed against the last said pivotal movement, means for electrically connecting the windings of said fixed units with each other, means for supplying alternating current to the movable synchro unit for the master blade with the resultant generation in the movable synchro winding for the slave blade of an alternating secondary current cyclically varying in voltage in accordance with the varying rotative relationship between the two units of the slave blade synchro and further varying in voltage in accordance with the varying relationship between the two movable synchro units which last said relationship is dependent upon said different cyclical pivotal movement of said slave blade, the result being that the average positive or negative voltage of said current represents said different movement of said slave blade and the greater or lesser lift thereof, means electrically connected with the movable synchro winding for the slave blade for rectifying the last said alternating current to direct current, a filter network electrically connected with the rectifying means for eliminating the cyclic changes in said voltage with the result that said average positive or negative voltage remains, and an indicator electrically connected with the filter network for indicating the said positive or negative voltage and for thus indicating greater or lesser lift of said slave blade.

21. In a helicopter comprising a fuselage with a pilot position thereon and comprising a substantially vertical power driven rotatable shaft connected therewith and also comprising a rotor on said shaft including a hub and at least two similar blades connected with the hub at their inner ends for movement about lead-lag axes substantially parallel to said shaft, one of said blades consituting a master blade and at least one other of said blades being a slave blade and being adapted for lift adjustment relatively to said master blade and said slave blade during rotation and as the result a different aerodynamic lift thereof being differently movable about its lead-lag axis, the combination with said rotor of means located at least partly thereon and rotatable therewith and automatically responsive to said different relative movement of said slave blade about its said lag axis, a nonrotary means located on the fuselage and connected with and controlled by said blade movement responsive means and serving to indicate the difference in blade lift that resulted in said different relative blade movement of said slave blade about its said lead-lag axis and to also indicate the direction of said difference in blade lift, an indicating means connected with and controlled by said blade movement responsive means and located on the fuselage within the range of observation of a pilot at said pilot position, said indicating means serving to indicate the difference in blade lift that resulted in said different relative blade movement and to also indicate the direction of said difference, a mechanism carried by said rotor and connected with the slave blade thereof for adjusting the lift of said slave blade, and control means carried by the fuselage independently of said rotor and operatively connected with said adjusting mechanism on the rotor for effecting and controlling the operation of said adjusting mechanism during rotation of said rotor, the last said means including a pilot operable member located adjacent said pilot position and enabling the pilot to effect lift adjustment of said slave blade in the direction and to the extent indicated by said indicating means.

22. In a helicopter comprising a fuselage and a substantially vertical power driven rotatable shaft connected therewith and also comprising a rotor on said shaft including a hub and at least two similar blades connected with the hub at their inner ends for movement about lead-lag axes substantially parallel to said shaft, one of said blades constituting a master blade and at least one other of said blades being a slave blade and being adapted for lift adjustment relatively to said master blade and said slave blade during rotation and as the result a different aerodynamic lift thereof being differently movable about its lead-lag axis, the combination with said rotor of means located at least partly thereon and rotatable therewith and automatially responsive to said different relative movement of said slave blade about its said lead-lag axis, a nonrotary means located on the fuselage and connected with and controlled by said blade movement responsive means and serving to indicate the difference in blade lift that resulted in said different relative blade movement of said slave blade about its said lead-lag axis and to also indicate the direction of said difference in blade lift, a mechanism carried by said rotor and connected with the slave blade thereof for adjusting the lift of said slave blade, control means carried by the fuselage independently of said rotor and operatively connected with said adjusting mechanism on the rotor for effecting and controlling the operation of said adjusting mechanism during rotation of said rotor, and mechanism connected with said indicating means for enabling the last said means to automatically cause the operation of said control means to effect lift adjustment of said slave blade in the direction and to the extent required for lift equalization.

23. In a helicopter comprising a fuselage and a substantially vertical power driven rotatable shaft connected therewith and also comprising a rotor on said shaft which rotor includes a plurality of similar blades each connected with the shaft for pivotal movement about an axis which is approximately horizontal and at a substantial angle to the blade length, one of said blades constituting a master blade and at least one other of said blades being a slave blade and being adapted for lift adjustment relatively to said master blade which slave blade during rotation and as the result of a lift different from that of the master blade is pivotally adjustable about its said axis differently than said master blade, the combination with said rotor of means located at least partly thereon and rotatable therewith and automatically responsive to pivotal adjustment of said slave blade different from that of the master blade, an indicating member located on the fuselage and movable relatively thereto, and means for operatively connecting said blade adjustment responsive means with said indicating member for moving it to a position which indicates the difference in blade lift that resulted in said different pivotal blade adjustment and to which also indicates the direction of said difference in blade lift so that said difference may be corrected by lift adjustment of said slave blade in the proper direction.

24. In a helicopter comprising a fuselage and a substantially vertical power driven rotatable shaft connected therewith and also comprising a rotor on said shaft which rotor includes a plurality of similar blades each connected with the shaft for pivotal movement about an axis which is approximately horizontal and at a substantial angle to the blade length, one of said blades constituting a master blade and at least one other of said blades being a slave blade and being adapted for lift adjustment relatively to said master blade which slave blade during rotation and as the result of a lift different from that of the master blade is pivotally adjustable about its said axis differently than said master blade, the combination with said rotor of an electrical device located at least partly thereon and rotatable therewith and automatically responsive to said different relative pivotal adjustment of said slave blade, an electrically actuated indicator on the fuselage, and electrical connections between said electrical device on the rotor and said electrically actuated indicator for causing the latter to indicate the difference in blade lift that resulted in said different relative pivotal blade adjustment and to also indicate the direction of said difference in blade lift so that said difference may be corrected by lift adjustment of said slave blade in the proper direction.

25. In a helicopter comprising a fuselage and a substantially vertical power driven rotatable shaft connected therewith and also comprising a rotor on said shaft which rotor includes a hub connected with the shaft for movement about a teeter axis perpendicular to the shaft axis and which rotor also includes two oppositely disposed similar slave and master blades connected with the hub at their inner ends for movement in unison therewith about said teeter axis, the said rotor during rotation and as the result of aerodynamic forces acting on the blades normally having cyclic oscillations about said teeter axis and the said slave blade as the result of a different lift thereof having an average oscillative position different from the average oscillative position of the master blade with a resultant different average oscillative position of the entire rotor, the combination with said rotor of means rotatable therewith and automatically responsive to said different average oscillative position thereof, a nonrotary indicating member located on the fuselage and movable relatively thereto, and means for operatively connecting said position responsive means with said indicating member for moving it to a position which indicates the difference in blade lift that resulted in said different average oscillative position of the rotor and which also indicates the direction of said difference in blade lift so that said difference may be corrected by lift adjustment of said slave blade in the proper direction.

26. In a helicopter comprising a fuselage and a substantially vertical power driven rotatable shaft connected therewith and also comprising a rotor on said shaft which rotor includes a hub connected with the shaft for movement about a teeter axis perpendicular to the shaft axis and which rotor also includes two oppositely disposed similar slave and master blades connected with the hub at their inner ends for movement in unison therewith about said teeter axis, the said rotor during rotation and as the result of aerodynamic forces acting on the blades normally having cyclic oscillations about said teeter axis and the said slave blade as the result of a different lift thereof having an average oscillative position different from the average oscillative position of the master blade with a resultant different average oscillative position of the entire rotor, the combination with said rotor of an electrical device rotatable therewith and automatically responsive to said different average oscillative position thereof, an electrically actuated indicator on the fuselage, and electrical connections between said electrical device on the rotor and said electrically actuated indicator for causing the latter to indicate the difference in blade lift that resulted in said different average oscillative position of the rotor and to also indicate the direction of said difference in blade lift so that said difference may be corrected by lift adjustment of said slave blade in the proper direction.

27. In a helicopter comprising a fuselage and a substantially vertical power driven rotatable shaft connected therewith and also comprising a rotor on said shaft which rotor includes a hub connected with the shaft for movement about a teeter axis perpendicular to the shaft axis and which rotor also includes two oppositely disposed similar slave and master blades connected with the hub at their inner ends for movement in unison therewith about said teeter axis, the said rotor during rotation and as the result of aerodynamic forces acting on the blades normally having cyclic oscillations about said teeter axis and the said slave blade as the result of a different lift thereof having an average oscillative position different from the average oscillative position of the master blade with a resultant different average oscillative position of the entire rotor, the combination with said rotor of an electrical synchro located at least partly thereon and comprising relatively movable primary and secondary units having windings, one of said units being connected for oscillatory movement in unison with the hub of said rotor and the other of said units being fixed against the last said pivotal movement, an electrically actuated indicator on the fuselage, and means including electrical connections to the primary synchro unit and from the secondary synchro unit to said indicator for generating a secondary electrical current and for transmitting the said secondary current to said indicator, the voltage of said secondary current being dependent upon the relationship between said primary and secondary synchro units and being therefore dependent upon said different average oscillative position of the rotor with the result that said indicator is moved in accordance with said different lift of said slave blade.

28. A helicopter as set forth in claim 27, wherein one unit of said synchro is rotatably adjustable about the pivotal axis so that the voltage of said secondary current is zero when average oscillative position of the slave blade is the same as that of the master blade.

29. In a helicopter comprising a fuselage and a substantially vertical power driven rotatable shaft connected therewith and also comprising a rotor on said shaft which rotor includes a hub connected with the shaft for movement about a teeter axis perpendicular to the shaft axis and which rotor also includes two oppositely disposed similar slave and master blades connected with the hub at their inner ends for movement in unison therewith about said teeter axis, the said rotor during rotation and as the result of aerodynamic forces acting on the blades normally having cyclic oscillations about said teeter axis and the said slave blade as the result of a different lift thereof having an average oscillative position different from the average oscillative position of the master blade with a resultant different average oscillative position of the entire rotor, the combination with said rotor of an electrical synchro located at least partly thereon and comprising relatively movable primary and secondary units each including at least one winding, one of said units being connected for oscillatory movement in unison with the hub of said rotor and the other of said units being fixed against the last said pivotal movement, means for supplying alternating primary current to the synchro primary winding with the resultant generation in the synchro secondary winding of an alternating secondary current cyclically varying in voltage and dependent upon the oscillatory movements of the rotor and therefore dependent upon a greater or lesser lift of said slave blade so that the average positive or negative voltage of said current represents said greater or lesser lift, means electrically connected with the synchro secondary winding for rectifying the last said alternating current to direct current, a filter network electrically connected with the rectifying means for eliminating the cyclic changes in said voltage with the result that said average positive or negative voltage remains, and an indicator electrically connected with the filter network for indicating the said positive or negative voltage and for thus indicating greater or lesser lift of said slave blade.

30. In a helicopter comprising a fuselage and a substantially vertical power driven rotatable shaft connected therewith and also comprising a rotor on said shaft which rotor includes a plurality of similar blades each connected with the shaft for pivotal movement about an axis which is approximately horizontal and at a substantial angle to the blade length, one of said blades constituting a master blade and at least one other of said blades being a slave blade and being adapted for lift adjustment relatively to said master blade which slave blade during rotation and as the result of a lift different from that of the master blade is pivotally adjustable about its said axis differently than said master blade, the combination with said rotor of means located at least partly thereon and rotatable therewith and automatically responsive to pivotal adjustment of said slave blade different from that of the master blade, a nonrotary means located on the fuselage and connected with and controlled by said blade adjustment responsive means and serving to indicate the difference in blade lift that resulted in said different pivotal blade adjustment of the rotor and to also indicate the direction of said difference in blade lift, a mechanism carried by said rotor and connected with the slave blade thereof for adjusting the lift of said slave blade, and control means carried by the fuselage independently of said rotor and operatively connected with said lift adjusting mechanism on the rotor for effecting and controlling the operation of said adjusting mechanism during rotation of said rotor to effect lift adjustment of said slave blade in the direction and to the extent indicated by said indicating means.

31. In a helicopter comprising a fuselage and a substantially vertical power driven rotatable shaft connected therewith and also comprising a rotor on said shaft which rotor includes a plurality of similar blades each connected with the shaft for pivotal movement about an axis which is approximately horizontal and at a substantial angle to the blade length, one of said blades constituting a master blade and at least one other of said blades being a slave blade and being adapted for lift adjustment relatively to said master blade which slave blade during rotation and as the result of a lift different from that of the master blade is pivotally adjustable about its said axis differently than said master blade, the combination with said rotor of means located at least partly thereon and rotatable therewith and automatically responsive to pivotal adjustment of said slave blade different from that of the master blade, an indicating means connected with and controlled by said blade adjustment responsive means and located on the fuselage within the range of observation of a pilot at said pilot position, said indicating means serving to indicate the difference in blade lift that resulted in said different pivotal blade adjustment and to also indicate the direction of said difference in blade lift, a mechanism carried by said rotor and connected with the slave blade thereof for adjusting the lift of said slave blade, and control means carried by the fuselage independently of said rotor and operatively connected with said lift adjusting mechanism on the rotor for effecting and controlling the operation of said adjusting mechanism during rotation of said rotor, the last said means including a pilot operable member located adjacent said pilot position and enabling the pilot to effect lift adjustment of said slave blade in the direction and to the extent indicated by said indicating means.

32. In a helicopter comprising a fuselage and a substantially vertical power driven rotatable shaft connected therewith and also comprising a rotor on said shaft which rotor includes a plurality of similar blades each connected with the shaft for pivotal movement about an axis which is approximately horizontal and at a substantial angle to the blade length, one of said blades constituting a master blade and at least one other of said blades being a slave blade and being adapted for lift adjustment relatively to said master blade which slave blade during rotation and as the result of a lift different from that of the master blade is pivotally adjustable about its said axis differently than said master blade, the combination with said rotor of means located at least partly thereon and rotatable therewith and automatically responsive to pivotal adjustment of said slave blade different from that of the master blade, a nonrotary means located on the fuselage and connected with and controlled by said blade adjustment responsive means and serving to indicate the difference in blade lift that resulted in said different pivotal blade adjustment and to also indicate the direction of said difference in blade lift, a mechanism carried by said rotor and connected with the slave blade thereof for adjusting the lift of said slave blade, control means carried by the fuselage independently of said rotor and operatively connected with said adjusting mechanism on the rotor for effecting and controlling the operation of said lift adjusting mechanism during rotation of said rotor, and mechanism connected with said indicating means for enabling the last said means to automatically cause the operation of said control means to effect lift adjustment of said slave blade in the direction and to the extent required for lift equalization.

33. In a helicopter comprising a fuselage and a substantially vertical power driven rotatable shaft connected therewith and also comprising a rotor on said shaft including a hub and at least two similar blades connected with the hub at their inner ends, one of said blades constituting a master blade and at least one other of said blades constituting a slave blade and being adapted for lift adjustment relatively to said master blade to correct an unbalance resulting from different lifts in said master and slave blades, the combination with said rotor and fuselage of first and second electrical synchros each comprising primary and secondary units having windings, at least one of the units of each synchro being movable relatively to the other unit thereof and the movable unit of the first synchro in the absence of an unbalance and at least once during each rotor rotation having a normal relationship with the movable unit of the second synchro, an electrically actuated indicator on the fuselage, means for supplying alternating current to the primary unit of the first synchro, means for electrically connecting the secondary unit of the first synchro with the primary unit of the second synchro and for connecting the secondary unit of the second synchro with said indicator, and means automatically responsive to any existing difference between the lift of the slave blade and that of the master blade which last said means serves to move the movable unit of the first synchro out of its said normal relation with the movable unit of the second synchro and to resultantly effect a change in the current at said indicator so as to indicate the last said difference in blade lift and so as to also indicate the direction of said difference so that said difference may be corrected by lift adjustment of said slave blade in the proper direction.

34. In a helicopter comprising a fuselage and a substantially vertical power driven rotatable shaft connected therewith and also comprising a rotor on said shaft including a hub and at least two similar blades connected with a hub at their inner ends, one of said blades constituting a master blade and at least one other of said blades constituting a slave blade and being adapted for lift adjustment relatively to said master blade to correct an unbalance resulting from different lifts in said master and slave blades, the combination with said rotor and fuselage of first and second electrical synchros each comprising primary and secondary units having windings, at least one of the units of each synchro being movable relatively to the other unit thereof and the movable unit of the first synchro in the absence of an unbalance and at least once during each rotor rotation having a normal relationship with the movable unit of the second synchro, an electrically actuated indicator on the fuselage, means for supplying alternating current to the primary unit of the first synchro, means for electrically connecting the secondary unit of the first synchro with the primary unit of the second synchro and for connecting the secondary unit of the second synchro with said indicator, means automatically responsive to any existing difference between the lift of the slave blade and that of the master blade which last said means serves to move the movable unit of the first synchro out of its said normal relation with the movable unit of the second synchro and to resultantly effect a change in the current at said indicator so as to indicate the last said difference in blade lift and so as to also indicate the direction of said difference so that said difference may be corrected by lift adjustment of said slave blade in the proper direction, a mechanism carried by said rotor and connected with the slave blade thereof for adjusting the lift of said slave blade, and control means carried by the fuselarge independently of said rotor and operatively connected with said adjusting mechanism on the rotor for effecting and controlling the operation of said adjusting mechanism during rotation of said rotor to effect lift adjustment of said slave blade in the direction and to the extent indicated by said indicating means.

References Cited in the file of this patent

UNITED STATES PATENTS

| | | |
|---|---|---|
| 2,408,489 | Stalker | Oct. 1, 1946 |
| 2,620,888 | Avery | Dec. 9, 1952 |
| 2,630,709 | Hoffmann et al. | Mar. 10, 1953 |
| 2,663,374 | Vandermeer | Dec. 22, 1953 |
| 2,669,120 | Jensen et al. | Feb. 16, 1954 |
| 2,720,271 | Alex | Oct. 11, 1955 |